United States Patent [19]

Takezawa et al.

[11] Patent Number: 4,590,580
[45] Date of Patent: May 20, 1986

[54] AUTOMATIC MEASUREMENT/COMPENSATION APPARATUS FOR TOOL DIAMETER

[75] Inventors: Isao Takezawa; Shunsuke Wakaoka, both of Nagoya, Japan

[73] Assignee: Kabushiki Kaisha Okuma Tekkosho, Aichi, Japan

[21] Appl. No.: 522,252

[22] Filed: Aug. 9, 1983

[30] Foreign Application Priority Data

Oct. 12, 1982 [JP] Japan .................. 57-178845

[51] Int. Cl.$^4$ .................. G06F 15/46; G05B 19/18
[52] U.S. Cl. .................. 364/571; 318/572; 318/634; 364/170
[58] Field of Search .................. 364/170, 571; 318/572, 318/634

[56] References Cited

U.S. PATENT DOCUMENTS

| | | | |
|---|---|---|---|
| 3,947,667 | 3/1976 | Parker | 318/572 |
| 4,070,608 | 1/1978 | Rosshirt et al. | 318/572 |
| 4,214,191 | 7/1980 | Watanabe et al. | 318/572 |
| 4,471,443 | 9/1984 | Kinoshita et al. | 364/170 X |
| 4,510,566 | 4/1985 | Gordon | 364/170 X |

FOREIGN PATENT DOCUMENTS 51937  5/1982  European Pat. Off. ............ 318/572

*Primary Examiner*—Felix D. Gruber
*Attorney, Agent, or Firm*—Wenderoth, Lind & Ponack

[57] ABSTRACT

An automatic apparatus for an NC machine tool which automatically changes tools, automatically measures the tool size and automatically compensates for the amount of abrasion without stopping for indexing and positioning. The apparatus can automatically and easily measure and compensate for variations in the diameter of cutters in an end mill, a boring machine, etc.

5 Claims, 7 Drawing Figures

AUTOMATIC MEASUREMENT/COMPENSATION APPARATUS FOR TOOL DIAMETER

BACKGROUND OF THE INVENTION

This invention relates to an automatic measurement/compensation apparatus for tool diameters of an NC machine tool in which the tool is mounted on a main spindle and rotated for machining.

There are known automatic apparatus for an NC machine tool, and especially for a machining center which automatically changes tools, and automatically measures the tool sizes and automatically compensates for abrasion. In such a prior apparatus, however, the operation of the tool must be stopped for indexing and positioning, which requires a controlling program or an additional device, presenting problems in handling.

SUMMARY OF THE INVENTION

Accordingly, an object of this invention is to provide an apparatus which can automatically and easily measure and compensate for variations in the diameter of cutters in an end mill, a boring bar, a milling cutter, etc.

Another object of this invention is to provide a device which is most suitable to measure the amount of abrasion of the reference and object tools in the machine tool.

The nature, principle and utility of the invention will become more apparent from the following detailed description when read in conjunction with the accompanying drawings.

DETAILED DESCRIPTION OF THE INVENTION

This invention will now be described referring to the attached drawings.

Figure 1:
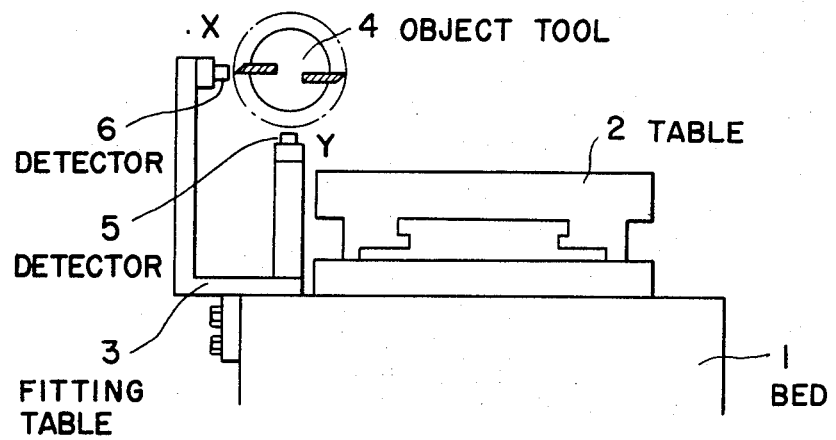
FIG. 1 is a schematic view to explain the positions where detectors according to this invention are to be mounted on the machine tool.
Figure 2A:
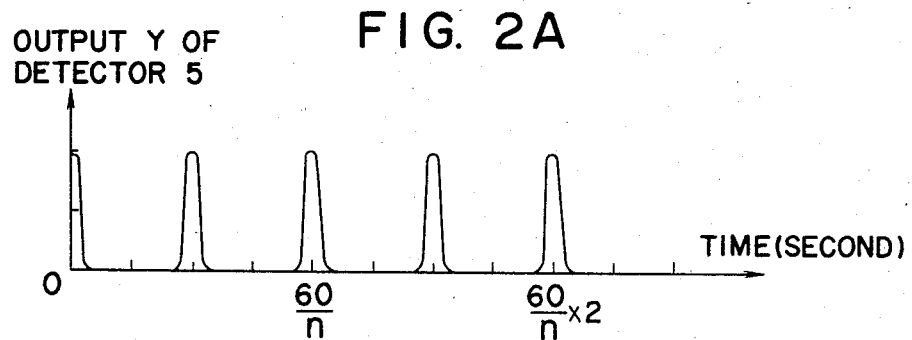
FIGS. 2A and 2B are output charts of detectors which are used to show the respective measured values of an end mill.
Figure 2B:
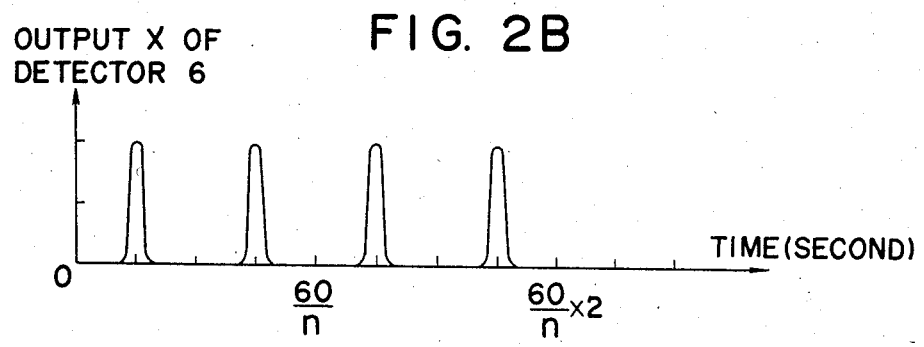

In FIG. 1 the reference numeral 1 denotes a bed of an NC machine tool, for instance, a known horizontal type machining center which machines workpieces by using rotating tools; numeral 2 denotes a table on the bed 1, and numeral 3 denotes a fitting table. The fitting table 3 is fixed on the bed 1 at a position which does not obstruct the movement of the table 2 and is suitable for positioning a main spindle which is horizontally journaled. On the fitting table 3, non-contact detectors 5 and 6 are mounted, respectively. The detector 5 measures radial values in the vertical direction or Y-direction of an object tool 4 and of a reference tool (not shown) both of which are mounted on the main spindle positioned at the measurement position, and the detector 6 similarly measures the same values in the horizontal direction or X-direction. Those non-contact detectors 5 and 6 may be selected from any of the detectors which ae commercially available as long as the output therefrom is proportional to the interval space between the attached detector and a tool to be measured. Where the object tool 4 is an end mill with two cutters, the detectors 5 and 6 output the waveheight or its mean value every time the cutters pass in front of the detectors 5 and 6 as shown in FIGS. 2A and 2B, respectively. FIG. 2A shows an output Y of the detector 5 when the measured tool mounted on the spindle is rotated at n revolutions per minute, and FIG. 2B shows an output X of the detector 6.

Figure 3:
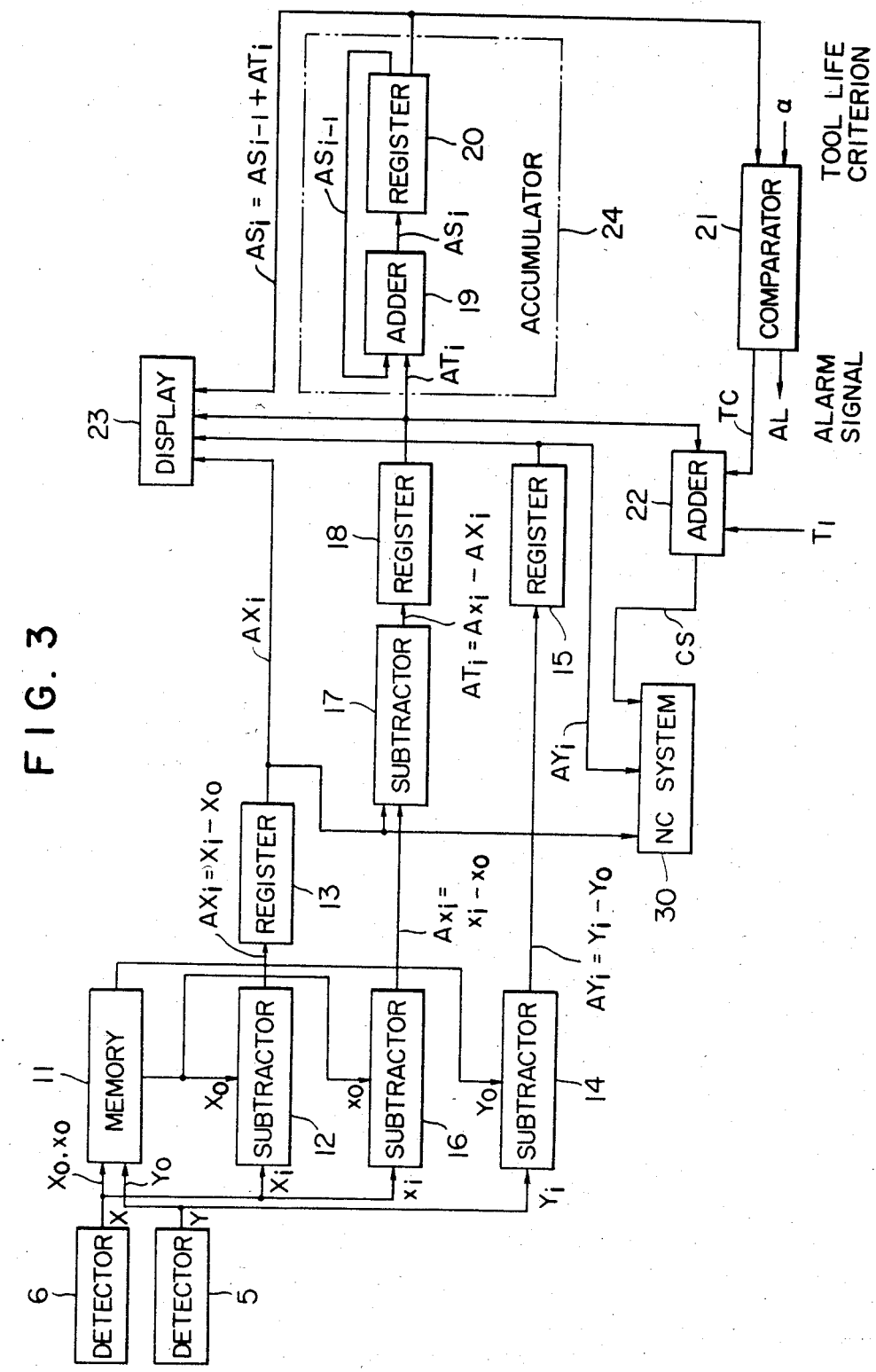
FIG. 3 is a block diagram of a preferred embodiment of the apparatus according to this invention.

As shown in FIG. 3, the outputs X and Y of the detectors 6 and 5 are inputted to the memory 11, respectively, and the memory 11 stores the initial values $X_0$, $Y_0$ and $x_0$ of the reference tool and the object tool 4 before working which have been measured by the detectors 5 and 6 while the tools are rotating. The reference numeral 12 denotes a subtractor which calculates the difference $AX_i$ ($i=1, 2, \ldots n$) between the measured value $X_i$ ($i=1, 2, \ldots n$) of the rotating reference tool detected by the detector 6 and the initial value $X_0$ stored in the memory 11 in order to obtain the thermal displacement amount after a predetermined number of workpieces have been machined. A register 13 sequentially stores the difference values $AX_i = X_i - X_0$ of the subtractor 12, and then the stored value $AX_i$ is inputted to the NC system 30 as a thermal displacement compensation volume of the X-direction (horizontal) as well as displaying same on a display 23. On the other hand, the reference numeral 14 denotes a subtractor which calculates the difference $AY_i$ ($i=1, 2, \ldots n$) between the measured value $Y_i$ ($i=1, 2, \ldots n$) of the rotating reference tool detected by the detector 5 after the same number of workpieces have been machined as in the case of the subtractor 12 and the initial value $Y_0$ stored in the memory 11. A register 15 sequentially stores the difference values $AY_i = Y_i - Y_0$ of the subtractor 14, and then the stored value $AY_i$ is inputted to the NC system 30 as the thermal displacement compensation value of the Y-direction (vertical) as well as displaying same on the display 23. A subtractor 16 calculates the difference $Ax_i$ ($i=1, 2, \ldots n$) between the value $x_i$ of the rotating object tool 4 detected by the detector 6 and the initial value $x_0$ stored in the memory 11 in order to seek the variations in the tool diameter after the same number of workpieces have been machined as noted above. The reference numeral 17 denotes a subtractor which calculates the amount of abrasion $AT_i$ ($i=1, 2, \ldots n$) of the object tool 4 which is the difference ($Ax_i - AX_i$) between the stored value $AX_i$ in the register 13 and the difference value $Ax_i$ outputted from the subtractor 16.

A register 18 sequentially stores the amount of abrasion $AT_i = Ax_i - AX_i$ on the object tool from the subtractor 17, and an adder 19 adds the amount of abrasion $AT_i$, which is the difference value $AT_i$ sequentially stored in the register 18, to obtain an accumulated value $AS_i = AS_{i-1} + AT_i$. The reference numeral 20 denotes a register which stores the accumulated value $AS_i$ and displays same on the display 23, forming an accumulator 24 together with the adder 19. The accumulator 24 accumulates, in the adder 19, by adding the difference value $AT_i$ which is outputted from the register 18 to the value $AS_{i-1}$ outputted from the register 20 for $i=1$ to n, and the value $AS_i = AS_{i-1} + AT_i$ accumulated in the adder 19 is directly transmitted to the register 20 and then is outputted to a comparator 21 and is shown on the display 23 as an accumulated value. The comparator 21 compares the accumulated value $AS_i$ with a tool life criterion $\alpha$ set by an operator in advance, and if $AS_i < \alpha$, outputs a tool compensation signal TC to the adder 22 and if $AS_i \geq \alpha$, outputs an alarm signal AL. If a tool compensation signal TC is outputted from the comparator 21, the adder 22 adds the tool compensation amount $AT_i$ outputted from the register 18 to the initial tool compensation value $T_1$ or the compensation value before the machining of the workpieces starts (for instance, the value for compensating for the errors in mounting and the abrasion value of the object tool obtained by machining up to the previous workpiece). The adder 22 outputs an adding compensation signal CS to the NC system 30. The display 23 displays the stored value $AX_i$ of the register 13, the stored value $AY_i$ of the register 15 and the accumulated value $AS_i$ of the accumulator 24.

Figure 4:
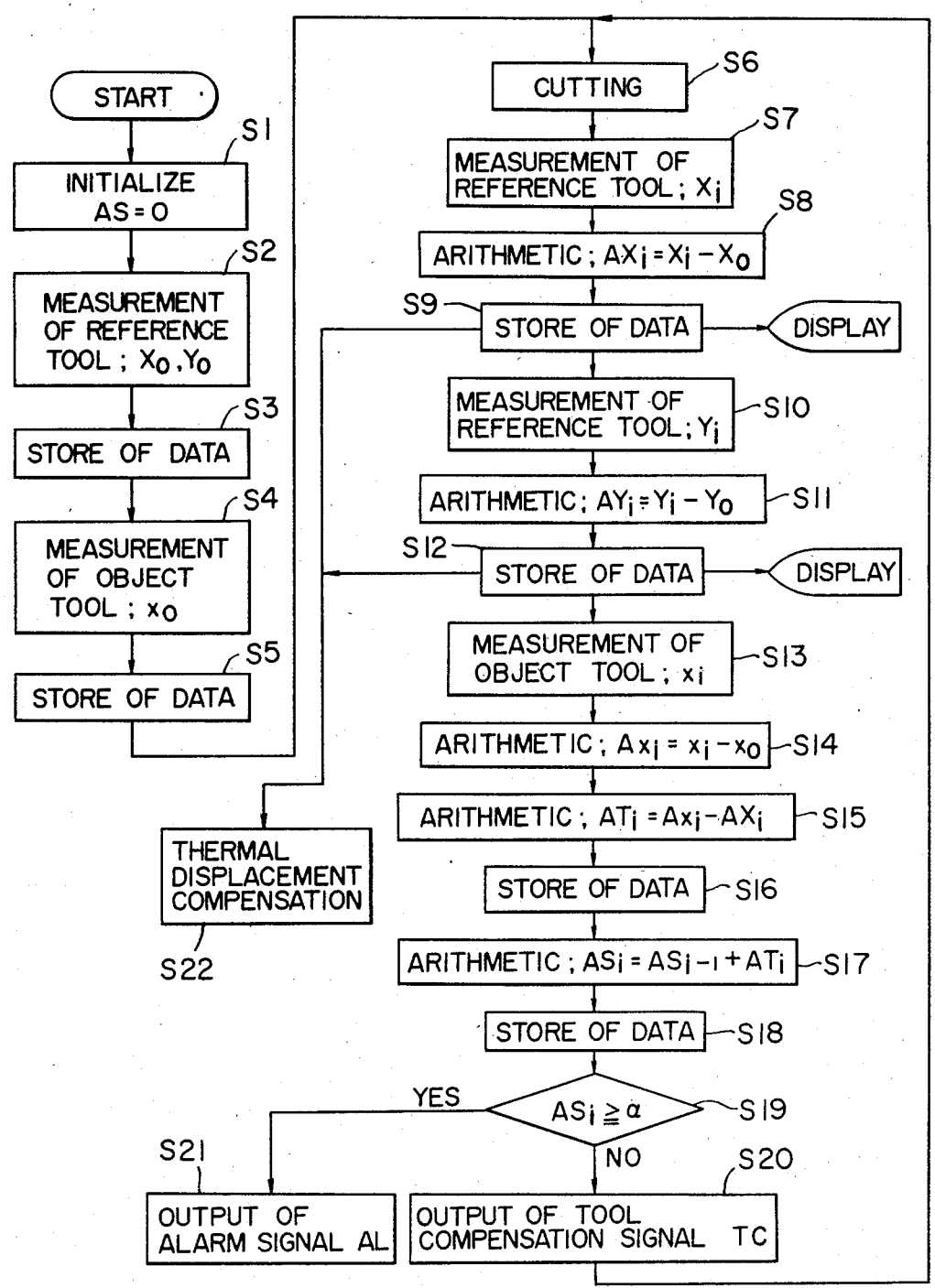
FIG. 4 is a flowchart used to show the operation of the apparatus.

The operation will now be explained referring to the flowchart shown in FIG. 4.

Figure 5A:
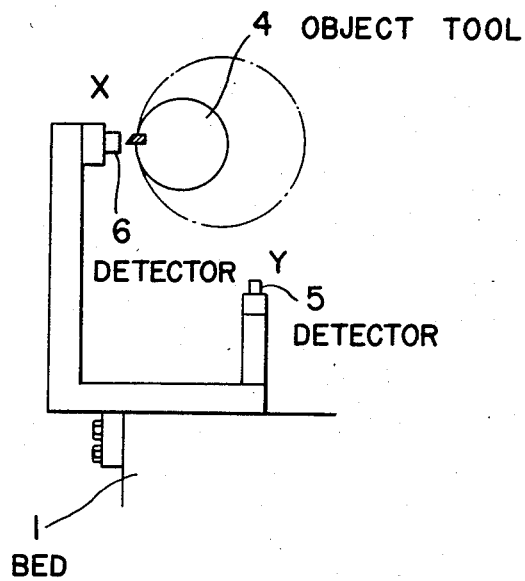
FIGS. 5A and 5B are schematic views used to show an example to individually measure the diameter of X and Y axes, respectively.
Figure 5B:
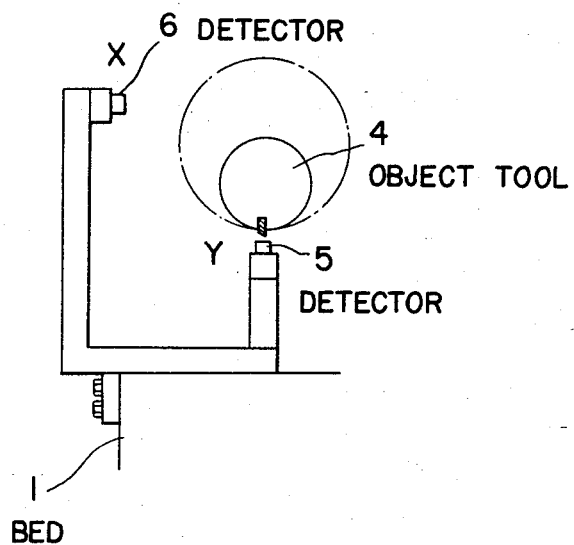

First of all, the accumulator 24 comprising the adder 19 and the register 20 is initialized to zero (step S1). In other words, the accumulated value AS in the accumulator 24 is preset to zero. Next, the detectors 5 and 6 measure the values of the reference tool mounted on a main spindle and rotating at the measurement position (step S2) and the memory 11 stores the above values as the initial values $X_0$ and $Y_0$, respectively (step S3); then the detector 6 measures the value of an object tool 4 before machining a workpiece; the object tool 4 is mounted on the main spindle and is rotated at the measurement position (step S4) and the memory 11 stores the measurement as the initial value $x_0$ (step S5). Besides, the object tool 4 shown in FIG. 1 shows the case of the maximum diameter. In the case of a smaller diameter of the tool, the X-direction and Y-direction diameters are individually measured as shown in FIGS. 5A and 5B.

At the next step S6, a cutting or machining operation using the object tool 4 starts for the workpiece fixed on the table 2. After a predetermined number of workpieces have been machined, the main spindle is positioned at the measurement position and the object tool 4 is replaced by the reference tool by means of an automatic tool changer or by an operator, and the reference tool is measured as $X_1$ ($i=1$; hereinafter the suffix 1 denotes $i=1$) by the detector 6 (step S7). At the step S8, the subtractor 12 calculates the thermal displacement value $AX_1$ in the X-direction of the machine tool using the measured value $X_1$ and the initial value $X_0$ stored in the memory 11. At the step S9, the subtracted value $AX_1$ is stored in the register 13, and displayed on the display 23 and at the same time the thermal displacement value $AX_1$ in the X-direction is inputted to the NC system 30. The reference tool is measured as $Y_1$ similarly by the detector 5 (step S10) and the subtractor 14 calculates the thermal displacement value $AY_1$ in the Y-direction of the machine tool using the measured value $Y_1$ and the initial value $Y_0$ stored in the memory 11 (step S11). At the step S12, the subtracted value $AY_1$ is stored in the register 15 and displayed on the display 23 and at the same time the thermal displacement amount $AY_1$ in the Y-direction is inputted to the NC system 30.

At the next step S13, the reference tool is again replaced by the object tool 4 on the main spindle and the object tool 4 is measured at that time point of working by the detector 6. At the step S14, the tool diameter variation $Ax_1$ is calculated by the subtractor 16 from the measured value $x_1$ of the step S13 and the initial value $x_0$ stored in the memory 11 in advance. The tool abrasion value $AT_1$ is obtained from the subtracted value $Ax_1$ and the thermal displacement amount $AX_1$ in the X-direction stored in the register 13 (step S15).

At the same time, the tool abrasion value $AT_1$ is stored in the register 18 (step S16), and then the tool abrasion value $AT_1$ is accumulated by the adder 19 in the accumulator 24 (step S17). Since the accumulator 24 has been initialized, $AT_1$ is added to $AS_0=0$ in the adder 19. At the step S18, the accumulated value $AS_1 = AT_1$ is stored in the register 20 and then stored in the accumulator 24 as $AS_1$. At the step S19, the accumulated value $AS_1$ is compared with the preset tool life criterion $\alpha$ and if the decision of the relation $AS_1 \geq \alpha$ does not hold or is "NO", the tool compensation signal TC is outputted from the comparator 21. At the step S20, the tool compensation amount $AT_1$ stored in the register 18 is added by the adder 22 to the initial compensation value $T_1$ and then compensation signal CS is transmitted to the NC system 30. Since $AS_1 < \alpha$, the operation returns to the above-mentioned step S6 again after the tool compensation for machining a predetermined number of workpieces. Operational steps are repeated in turn for $i=1$ to n while sequentially performing tool abrasion compensation and thermal displacement compensation of the machine tool until $AS_i \geq \alpha$ holds or "YES" at the step S19, at which point an alarm signal AL is outputted from the comparator 21. That is, steps 6–19 are repeated until an alarm signal is output at step 19. Then, the worn tool is replaced by a new tool by the automatic tool changer so as to perform subsequent cutting operation in a similar manner.

As described in the foregoing, since this invention enables measurement of tools while rotating, measurement of multicutting edges can be performed without requiring the time for indexing, etc. in a shorter time and at a higher efficiency. The apparatus according to this invention can measure the tool life and thermal displacement and can make necessary compensation, thereby providing a higher working precision.

Although the tool is replaced for thermal displacement by the reference tool after a cutting operation and then the reference tool is replaced by an object tool for obtaining the tool abrasion value in the above embodiment, it is possible that the tool abrasion value is obtained directly after the cutting operation and then the tool is replaced by a reference tool for obtaining the thermal displacement value.

What is claimed is:

1. An automatic measurement/compensation apparatus for the tool diameter of a machine tool which machines a workpiece by rotating a tool mounted on a main spindle, comprising a first non-contact detector provided on a fitting table of the machine tool which detects the displacement in one direction from the center of rotation of the rotating tool, a memory which stores the initial value $X_0$ measured by said detector of a reference tool when it is mounted on the main spindle and rotated and the initial value $x_0$ measured by said detector of an object tool before working when it is mounted and rotated, a first subtractor which calculates the thermal displacement amount $AX_i$ of the difference between the measured value $X_i$ of the object tool after the predetermined number of workpieces by said detector and the initial value $X_0$ stored in said memory, a first register which stores the subtraction value $AX_i$ from said first subtractor, a second subtractor which calculates the variation in tool diameter of the difference between the measured value $x_i$ of the object tool after the predetermined number of workpieces detected by said detector and the initial value $x_0$ stored in said memory, a third subtractor which calculates the tool compensation value $AT_i$ of the difference between the tool variation $Ax_i$ from said second subtractor and the thermal displacement amount $AX_i$ stored in said first register, a second register which stores the tool compensation amount $AT_i$ from said third subtractor, an accumulator which accumulates the values sequentially stored in said second register, a comparator which compares the accumulated value $AS_i$ of said accumulator with a tool life criterion $\alpha$ and outputs an alarm signal if the relation $AS_i \geq \alpha$ holds, and outputs a tool compensation signal, if the relation $AS_i < \alpha$ holds, and a first adder which adds the tool compensation value $AT_i$ of said second register to the initial tool compensation value $T_1$ for generating a tool compensation signal CS, and for applying said CS signal to an NC system.

2. The automatic measurement/compensation apparatus for tool diameter as claimed in claim 1, wherein said accumulator comprises a second adder and a third register, whereby said third register stores the output from said second adder and said second adder adds the output from said second register with the output from said third register.

3. The automatic measurement/compensation apparatus for tool diameter as claimed in claim 1, which further includes a second non-contact detector provided on the fitting table of the machine tool, whereby said first and second detectors detect the displacement in horizontal and vertical directions from the center of rotation of the revolving tool, respectively.

4. The automatic measurement/compensation apparatus for tool diameter as claimed in claim 3, which further includes a fourth subtractor which calculates the difference between the measured value of the reference tool detected by said second detector and the initial value stored in said memory and a fourth register which stores the output from said fourth subtractor.

5. The automatic measurement/compensation apparatus for tool diameter as claimed in claim 4, which further includes a display which displays the outputs of said first register and said fourth register.

* * * * *